United States Patent
Gu et al.

(10) Patent No.: US 9,479,000 B2
(45) Date of Patent: Oct. 25, 2016

(54) BATTERY PACK INCLUDING DIFFERENT KINDS OF CELLS AND POWER DEVICE INCLUDING THE SAME

(71) Applicant: SAMSUNG SDI CO., LTD., Yongin-si, Gyeonggi-do (KR)

(72) Inventors: Jae-Sung Gu, Yongin-si (KR); Eui-Hwan Song, Yongin-si (KR); Seok-Gyun Woo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 289 days.

(21) Appl. No.: 14/011,746

(22) Filed: Aug. 27, 2013

(65) Prior Publication Data

US 2014/0197794 A1    Jul. 17, 2014

(30) Foreign Application Priority Data

Jan. 16, 2013    (KR) .................. 10-2013-0004709

(51) Int. Cl.
| | |
|---|---|
| *H02J 7/00* | (2006.01) |
| *H01M 2/10* | (2006.01) |
| *H01M 10/44* | (2006.01) |
| *H01M 10/48* | (2006.01) |
| *H01M 10/04* | (2006.01) |
| *B60L 11/18* | (2006.01) |
| *H01M 10/42* | (2006.01) |

(52) U.S. Cl.
CPC .......... *H02J 7/0052* (2013.01); *H01M 2/1027* (2013.01); *H01M 2/1077* (2013.01); *H01M 10/04* (2013.01); *H01M 10/441* (2013.01); *H01M 10/482* (2013.01); *H02J 7/0003* (2013.01); *H02J 7/0021* (2013.01); *B60L 11/1868* (2013.01); *H01M 2010/4271* (2013.01); *H01M 2220/20* (2013.01); *Y02T 10/7005* (2013.01); *Y02T 10/7066* (2013.01)

(58) Field of Classification Search
USPC .......................................... 320/103, 112, 128
See application file for complete search history.

(56) References Cited

U.S. PATENT DOCUMENTS

| | | | |
|---|---|---|---|
| 7,893,562 B2* | 2/2011 | Oga .................... | H01M 10/482 307/71 |
| 2004/0001996 A1* | 1/2004 | Sugimoto ........ | G01R 19/16542 429/61 |
| 2005/0264263 A1* | 12/2005 | Tsenter ......................... | 320/128 |
| 2005/0284676 A1* | 12/2005 | King et al. ................... | 180/65.3 |
| 2006/0058897 A1 | 3/2006 | Senda et al. | |
| 2006/0232238 A1 | 10/2006 | Horii | |
| 2010/0207577 A1 | 8/2010 | Sugiyama et al. | |

(Continued)

FOREIGN PATENT DOCUMENTS

| | | |
|---|---|---|
| DE | 10 2011 116 781 A1 | 5/2012 |
| JP | 4258731 B2 | 2/2009 |

(Continued)

OTHER PUBLICATIONS

European Search Report and Written Opinion for Patent Application No. 13194134.6, dated Jan. 8, 2014, 7 pages.

*Primary Examiner* — Brian Ngo
(74) *Attorney, Agent, or Firm* — Lewis Roca Rothgerber Christie LLP (57) ABSTRACT

There is provided a battery pack including a mixed cell and a power device including the same. The mixed cell may include a first cell and a second cell having different electrical characteristics. The electrical characteristics may include at least one of an open circuit voltage characteristic corresponding to a state of charge, an internal resistance, an operation voltage, or a capacity.

12 Claims, 9 Drawing Sheets

(56) References Cited

U.S. PATENT DOCUMENTS

| | | |
|---|---|---|
| 2011/0025127 A1 | 2/2011 | Choi et al. |
| 2011/0305925 A1 | 12/2011 | Ro |
| 2012/0015223 A1* | 1/2012 | Bhardwaj et al. ............... 429/94 |
| 2012/0025753 A1* | 2/2012 | Chen ............................ 320/103 |
| 2012/0109503 A1 | 5/2012 | Yang et al. |
| 2012/0243130 A1 | 9/2012 | Gaben |
| 2012/0248869 A1* | 10/2012 | Itagaki ................ B60L 11/1868 307/9.1 |
| 2013/0063091 A1* | 3/2013 | Nishi ................. B60L 11/1824 320/126 |
| 2013/0099747 A1* | 4/2013 | Baba ..................... H02J 7/0019 320/118 |
| 2013/0106355 A1* | 5/2013 | Kim ..................... H02J 7/0013 320/118 |
| 2013/0113493 A1* | 5/2013 | Kanno .................. H01M 10/48 324/426 |
| 2014/0087227 A1* | 3/2014 | Shih et al. ....................... 429/99 |
| 2014/0132226 A1* | 5/2014 | Sakamoto ............. H02H 9/001 320/166 |
| 2014/0203735 A1* | 7/2014 | Sugiyama ................ H02J 1/00 318/139 |

FOREIGN PATENT DOCUMENTS

| | | |
|---|---|---|
| KR | 10-2010-0061714 A | 6/2010 |
| KR | 10-2011-0134751 A | 12/2011 |
| KR | 10-1103877 B1 | 1/2012 |
| KR | 10-2012-0095893 A | 8/2012 |
| WO | WO 2006/122395 A1 | 11/2006 |
| WO | WO 2011/114349 A2 | 9/2011 |

* cited by examiner

| SOC | 80% | 70% | 60% | 50% | 40% | 30% | 20% [kW] |
|---|---|---|---|---|---|---|---|
| MP | 19.9 | 19.2 | 18.7 | 18.3 | 18.1 | 17.8 | 17.2 |
| AP | 20.13 | 19.52 | 18.99 | 18.62 | 18.23 | 17.70 | 16.71 |
| BP | 20.12 | 19.24 | 18.65 | 17.71 | 17.03 | 10.84 | 3.81 |

FIG. 5

| SOC | 80% | 70% | 60% | 50% | 40% | 30% | 20% |
|---|---|---|---|---|---|---|---|
| B type cell | 249.3 | 242.3 | 243.6 | 247.6 | 254.7 | 266.9 | 284.2 |
| A type cell | 210.7 | 217.7 | 216.4 | 212.4 | 205.3 | 193.1 | 175.8 |

BATTERY PACK INCLUDING DIFFERENT KINDS OF CELLS AND POWER DEVICE INCLUDING THE SAME

CROSS-REFERENCE TO RELATED APPLICATION

This application claims priority to and the benefit of Korean Patent Application No. 10-2013-0004709 filed in the Korean Intellectual Property Office on Jan. 16, 2013, the entire contents of which are incorporated herein by reference.

BACKGROUND

1. Field

Aspects of the present invention relate to a battery pack including different kinds of cells and a power device including the same.

2. Description of the Related Art

A power device may include a battery pack for storing energy (e.g., regeneration energy and electrical energy generated by an engine while driving a hybrid vehicle). For example, a power device may include a first battery pack and a second battery pack. Electrical energy is stored in the first battery pack and the second battery pack, and power may be supplied from the first battery pack and the second battery pack to an electrical load. A pack voltage of the first battery pack may be higher than that of the second battery pack.

In general, the first battery pack includes the same kind of battery cells and the second battery pack also includes the same kind of battery cells. The kind of the battery cells that form the first battery pack may be different from that of the battery cells that form the second battery pack.

The above information disclosed in this Background section is only for enhancement of understanding of the background of the invention and therefore it may contain information that does not form the prior art that is already known in this country to a person of ordinary skill in the art.

SUMMARY

A cycle-life or output characteristic of a battery pack is determined by a characteristic of a battery cell, and as such, there are limitations on improving the cycle-life or output characteristic due to the characteristic of the battery cell. An exemplary embodiment of the present invention provides a battery pack capable of improving cycle-life and output characteristics thereof and a power device including the same.

A battery pack according to one aspect of the present invention includes a battery pack, including: a mixed cell including a first cell and a second cell, the second cell having a different electrical characteristic from that of the first cell and being coupled to the first cell in parallel. Here, the electrical characteristic includes at least one of an open circuit voltage characteristic corresponding to a state of charge, an internal resistance, an operation voltage, or a capacity.

The internal resistance may include the internal resistance when charging and the internal resistance when discharging.

A difference between the internal resistance of the first cell and the internal resistance of the second cell may be from about 0.5 mΩ to about 1 mΩ.

A difference between the operation voltage of the first cell and the operation voltage of the second cell may be from about 0.3V to about 1.5V.

The battery pack may include a plurality of mixed cells, which include the mixed cell, serially coupled to each other.

According to an aspect of the present invention, there is provided a battery pack, including: a first sub-battery pack including a plurality of first cells; and a second sub-battery pack including a plurality of second cells, the second sub-battery pack being coupled to the first sub-battery pack in parallel, Here, an electrical characteristic of the first cell is different from that of the second cell, and the electrical characteristic includes at least one of an open circuit voltage characteristic corresponding to a state of charge, an internal resistance, an operation voltage, or a capacity.

The internal resistance may include the internal resistance when charging and the internal resistance when discharging.

A difference between the internal resistance of the first cell and the internal resistance of the second cell may be from about 0.5 mΩ to about 1 mΩ.

A difference between the operation voltage of the first cell and the operation voltage of the second cell may be from about 0.3V to about 1.5V.

According to an aspect of the present invention, there is provided a power device, including: a first battery pack; a second battery pack; a power converter coupled between the first battery pack and the second battery pack; and a charge device for converting energy supplied from outside the power device to supply a power to the power converter. Here, the power converter is configured to supply the power supplied from the charge device to at least one of the first battery pack or the second battery pack, at least one of the first battery pack or the second battery pack includes a plurality of mixed cells including first cells and second cells, the second cells having a different electrical characteristic from that of the first cells and being coupled to the first cells in parallel, and the electrical characteristic includes at least one of an open circuit voltage characteristic corresponding to a state of charge, an internal resistance, an operation voltage, or a capacity.

According to an aspect of the present invention, there is provided a power device, including: a first battery pack; a second battery pack; a power converter coupled between the first battery pack and the second battery pack; and a charge device for converting energy supplied from outside the power device to supply a power to the power converter. Here, the power converter supplies the power supplied from the charge device to at least one of the first battery pack or the second battery pack, at least one of the first battery pack or the second battery pack includes: a first sub-battery pack including a plurality of first cells; and a second sub-battery pack including a plurality of second cells and coupled to the first sub-battery pack in parallel, an electrical characteristic of the first cells is different from that of the second cells, and the electrical characteristic includes at least one of an open circuit voltage characteristic corresponding to a state of charge, an internal resistance, an operation voltage, or a capacity.

According to an aspect of the present invention, there is provided a power device, including: a charge device for converting energy supplied from outside the power device to supply a power to a power converter; and a battery pack configured to be charged by the power supplied by the charge device. Here, the battery pack includes a plurality of mixed cells each including first cells and second cells, the second cells having a different electrical characteristic from that of the first cells and being coupled to the first cells in parallel, and the electrical characteristic includes at least one of an open circuit voltage characteristic corresponding to a state of charge, an internal resistance, an operation voltage, or a capacity.

According to an aspect of the present invention, there is provided a power device, including: a charge device for converting energy supplied from outside the power device to supply power to a power converter; and a battery pack configured to be charged by the power supplied by the charge device. Here, the battery pack includes: a first sub-battery pack including a plurality of first cells; and a second sub-battery pack including a plurality of second cells and coupled to the first sub-battery pack in parallel, an electrical characteristic of the first cells is different from that of the second cells, and the electrical characteristic includes at least one of an open circuit voltage characteristic corresponding to a state of charge, an internal resistance, an operation voltage, or a capacity.

According to the above aspects of the present invention, there is provided a battery pack having improved cycle-fife and output characteristics and a power device including the same.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" (e.g., electrically coupled or connected) to another element, the element may be "directly coupled" to the other element or coupled to the other element through one or more other elements. In addition, unless explicitly described to the contrary, the word "comprise" and variations such as "comprises" or "comprising" will be understood to imply the inclusion of stated elements but not the exclusion of any other elements. Also, where the terms "first", "second," etc. are used herein, these terms are intended identify the elements and do not necessarily indicate a number or order of the elements.

Figure 1:
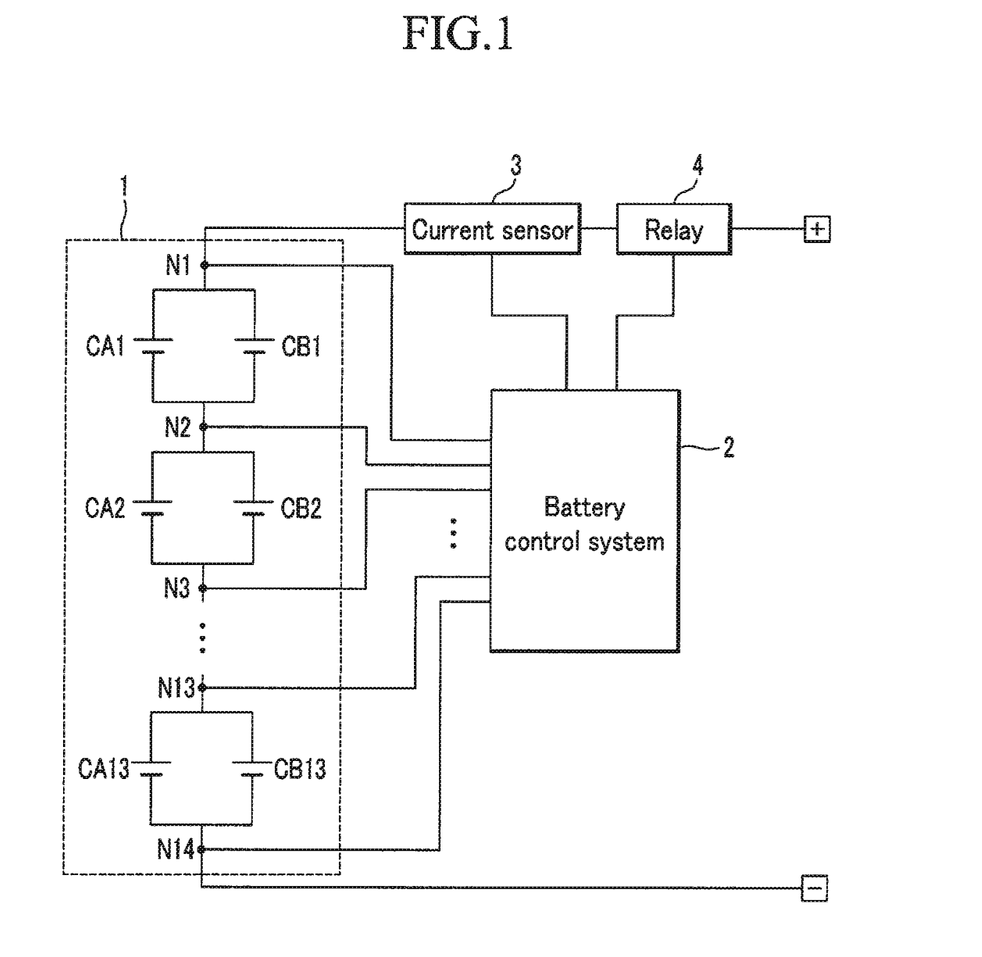
FIG. 1 is an illustration of a battery system including different cells according to an exemplary embodiment of the present invention.

FIG. 1 is an illustration of a battery system including different kinds of cells according to an exemplary embodiment of the present invention.

According to one embodiment of the present invention, an A type cell may be a 5.9 Ah cell and a B type cell may be a 4.2 Ah cell. The rated voltage of the A type cell may be about 3.69V, an operation voltage of the A type cell may be from about 2.8V to about 4.3V, a rated voltage of the B type cell may be about 3.5V, and an operation voltage of the B type cell may be from about 2.0V to about 4.3V. In one embodiment, a difference between lowest limit voltages or highest limit voltages of different kinds of cells may be from about 0.3V to about 1.5V.

In the embodiment illustrated in FIG. 1, the A type cell and the B type cell are coupled in parallel to form a unit cell (hereinafter, referred to as a 'mixed cell'). In the embodiment illustrated in FIG. 1, a battery pack 1 includes 13 serially coupled mixed cells.

The above-described embodiment of the present invention is an example for describing particular aspects and features of the present invention; accordingly, the present invention is not intended to be limited thereto. For example, in an embodiment where materials of negative electrodes of the A type cell and the B type cell are different from each other and those of positive electrodes of the A type cell and the B type cell are the same, the lowest operation voltages of the A type cell and the B type cell are different from each other and the highest operation voltages of the A type cell and the B type cell are the same. That is, the above conditions may be changed in accordance with chemical characteristics of the A type cell and the B type cell.

According to one embodiment, an internal resistance of the A type cell and that of the B type cell are different from each other in accordance with a state of charge (SOC). The internal resistance includes resistance in accordance with an SOC during discharge (hereinafter, referred to as a discharge resistance) and resistance in accordance with an SOC during charge (hereinafter, referred to as a charge resistance).

As used herein, different kinds of cells mean cells having different electrical characteristics, such as capacity (Ah), an operation voltage (V), or internal resistance. As illustrated in FIG. 1, A type cells are denoted by 'CA', B type cells are denoted by 'CB', and numbers beside 'CA' and 'CB' are used to distinguish the cells from each other.

A battery management system (or battery control system) 2 is coupled to channels to measure voltages of mixed cells (e.g., coupled to thirteen channels to measure thirteen mixed cells). One channel is associated with both ends of a unit cell. For example, in FIG. 1, a first channel is associated with a node N1 and a node N2, a second channel is associated with the node N2 and a node N3, and a last channel (here, the 13$^{th}$ channel) is associated with a node N13 and a node N14.

A current sensor 3 may be serially coupled to the battery pack 1 to generate a signal in accordance with a current that flows through the battery pack 1. The battery management system 2 receives the signal from the current sensor 3 in order to sense the current that flows through the battery pack 1.

A positive electrode of the battery pack 1 is coupled to a positive output end (+) and a negative electrode of the battery pack 1 is coupled to a negative output end (−). Charge and discharge of the battery pack may be controlled by a relay 4 coupled between the positive output end (+) and the positive electrode of the battery pack 1.

When overcharge or over-discharge of the battery pack 1 coupled to the battery management system 2 is sensed, or when high voltages or low voltages that deviate from an operation voltage range are sensed from among voltages of the mixed cells that form the battery pack 1, the relay 4 is blocked (i.e., is controlled to open) so that a protection operation is realized.

Figure 2:
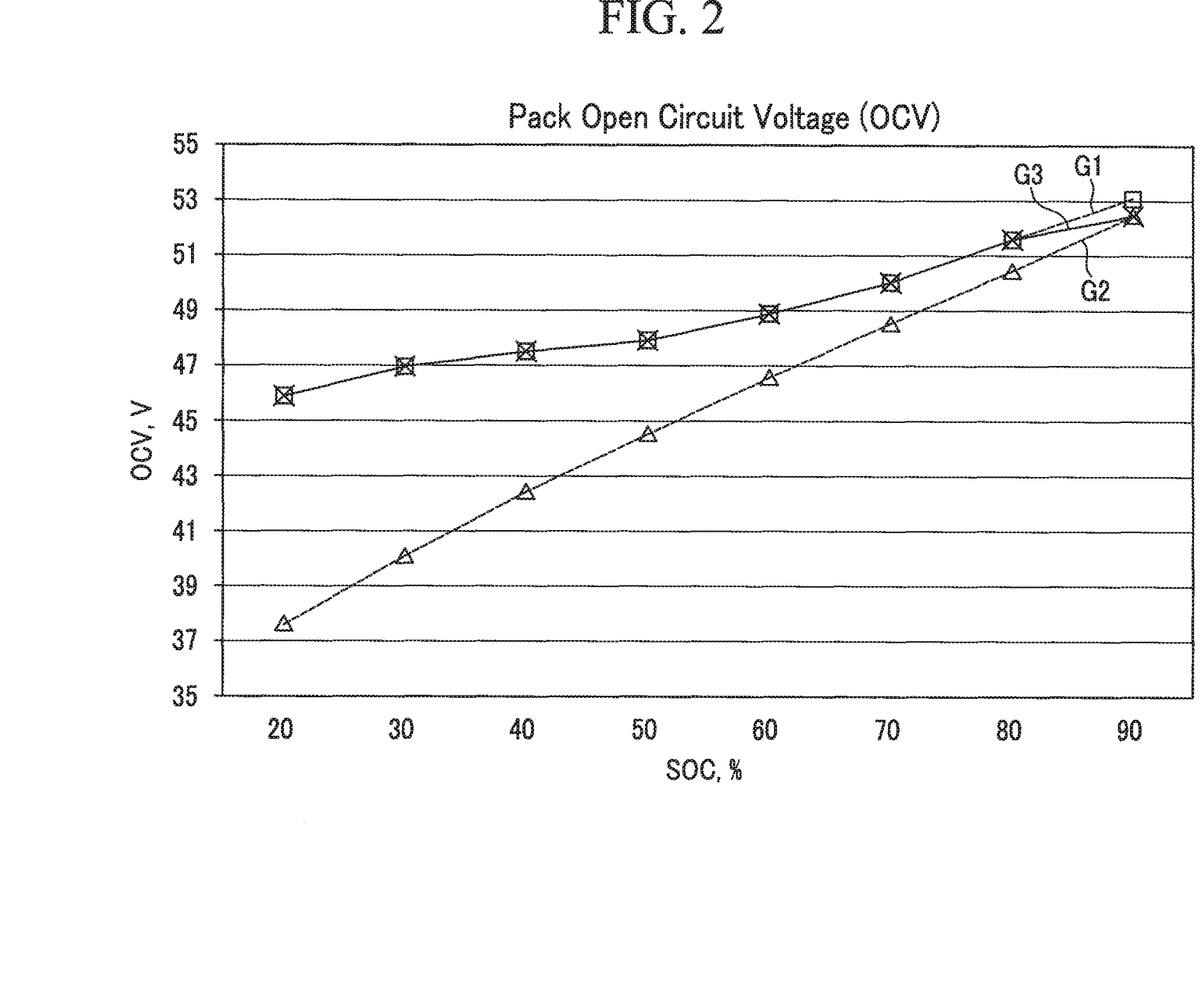
FIG. 2 is an open circuit voltage (OCV) graph in accordance with a state of charge (SOC) of a battery pack including mixed cells according to an exemplary embodiment of the present invention.

FIG. 2 is an open circuit voltage (OCV) graph in accordance with a state of charge (SOC) of a battery pack including mixed cells according to an exemplary embodiment of the present invention.

In FIG. 2, a graph (or line) G1 represents a SOC-OCV characteristic of a battery pack including A type cells, and a graph G2 represents a SOC-OCV characteristic of a battery pack including B type cells. The SOC-OCV characteristic of the battery pack 1 illustrated in FIG. 2 may be controlled by a battery management system 2.

According to one embodiment, up to a section in which an SOC is less than about 80%, the SOC-OCV characteristic is controlled according to the SOC-OCV graph G1. In a section where the SOC is from about 80% to about 90%, the SOC-OCV characteristic may be controlled according to a line that connects an 80% point of the SOC-OCV graph G1 and a 90% point of the SOC-OCV graph G2. For example, the SOC-OCV characteristic may be controlled according to the graph G3.

The graph illustrated in FIG. 2 is only an example for describing the exemplary embodiment of the present invention and the SOC-OCV characteristic is not limited to FIG. 2. For example, the SOC-OCV characteristic of the battery pack 1 according to an embodiment of the present invention may form a graph positioned between the SOC-OCV graph G1 and the SOC-OCV graph G2.

The SOC-OCV characteristic may be added as an electrical characteristic between different kinds of cells.

Figure 3:
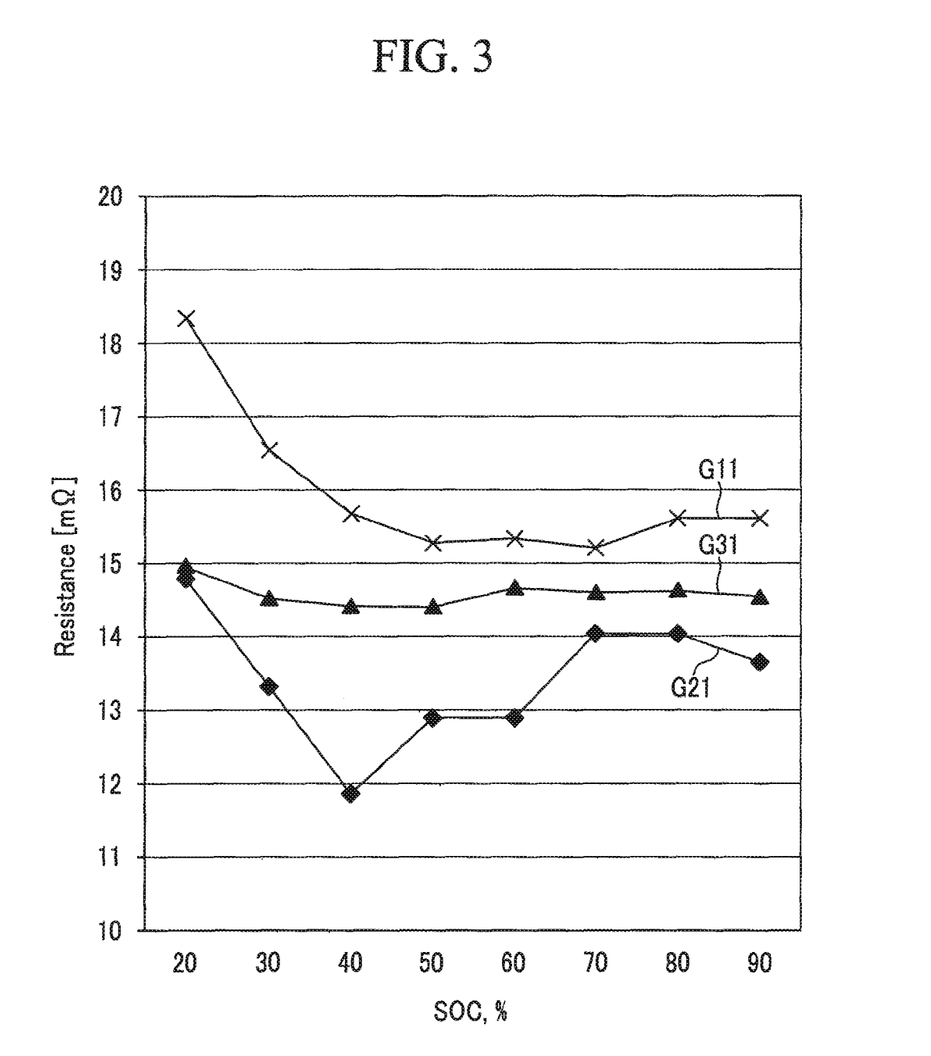
FIG. 3 is a graph illustrating discharge resistance in accordance with an SOC of a battery pack according to an exemplary embodiment of the present invention.

FIG. 3 illustrates a discharge resistance in accordance with an SOC of a battery pack according to an exemplary embodiment of the present invention.

In FIG. 3, a graph (or line) G11 represents a discharge resistance (SOC-DR) characteristic in accordance with an SOC of a battery pack including A type cells, and a graph G21 represents an SOC-DR characteristic of a battery pack including B type cells.

In FIG. 3, a graph G31 represents an SOC-DR characteristic of a battery pack 1 including mixed cells. As shown in FIG. 3, the graph G31 is between the graph G11 and the graph G21.

A difference between internal resistances of different kinds of cells may be from about 0.5 mΩ to about 1.0 mΩ.

Due to a difference in internal resistance, different currents flow through the different cell types of a mixed cell so that a cycle-life of the mixed cell may be improved.

For example, the internal resistance of an A type cell may be larger than that of a B type cell (e.g., under the same SOC condition). Therefore, when a current flows through the battery pack 1 including the mixed cells, a larger amount of current may flow through the B type cells as compared to the current flowing through the A type cells.

The A type cell having a capacity that is larger than that of the B type cell has a feature where discharge power is larger in a region where the SOC is low. However, in this case, the A type cell has a larger aging degree in accordance with a magnitude of a current than that of the B type cell.

In the mixed cell, it is possible to make the current that flows through the A type cell smaller than that flowing through the B type cell, and to improve the cell aging degree while maintaining the discharge power advantage of the A type cell.

Figure 4:
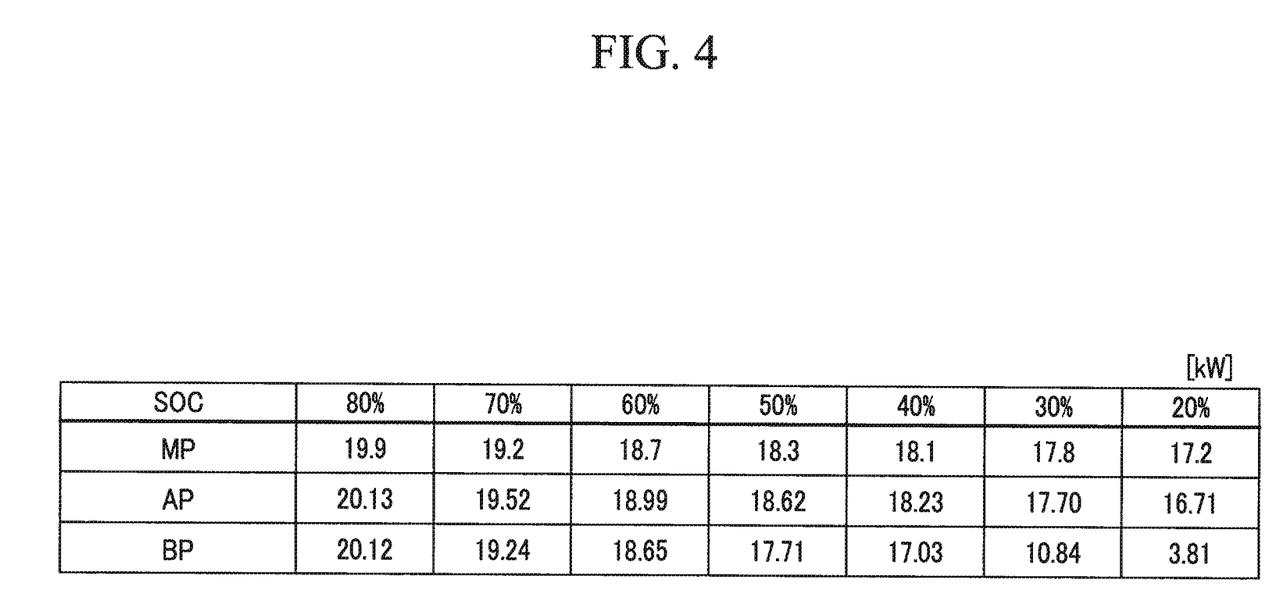
FIG. 4 is a table illustrating discharge power in accordance with an SOC of a battery pack according to an exemplary embodiment of the present invention.

FIG. 4 is a table illustrating discharge power in accordance with an SOC of a battery pack according to an exemplary embodiment of the present invention. The discharge power illustrated in FIG. 4 represents discharge power discharged for two seconds.

In the table illustrated in FIG. 4, discharge power MP of a battery pack formed with mixed cells is shown. Also, in the table illustrated in FIG. 4, discharge power AP of a battery pack formed of only A type cells and discharge power BP of a battery pack formed of only B type cells are represented.

Figure 5:
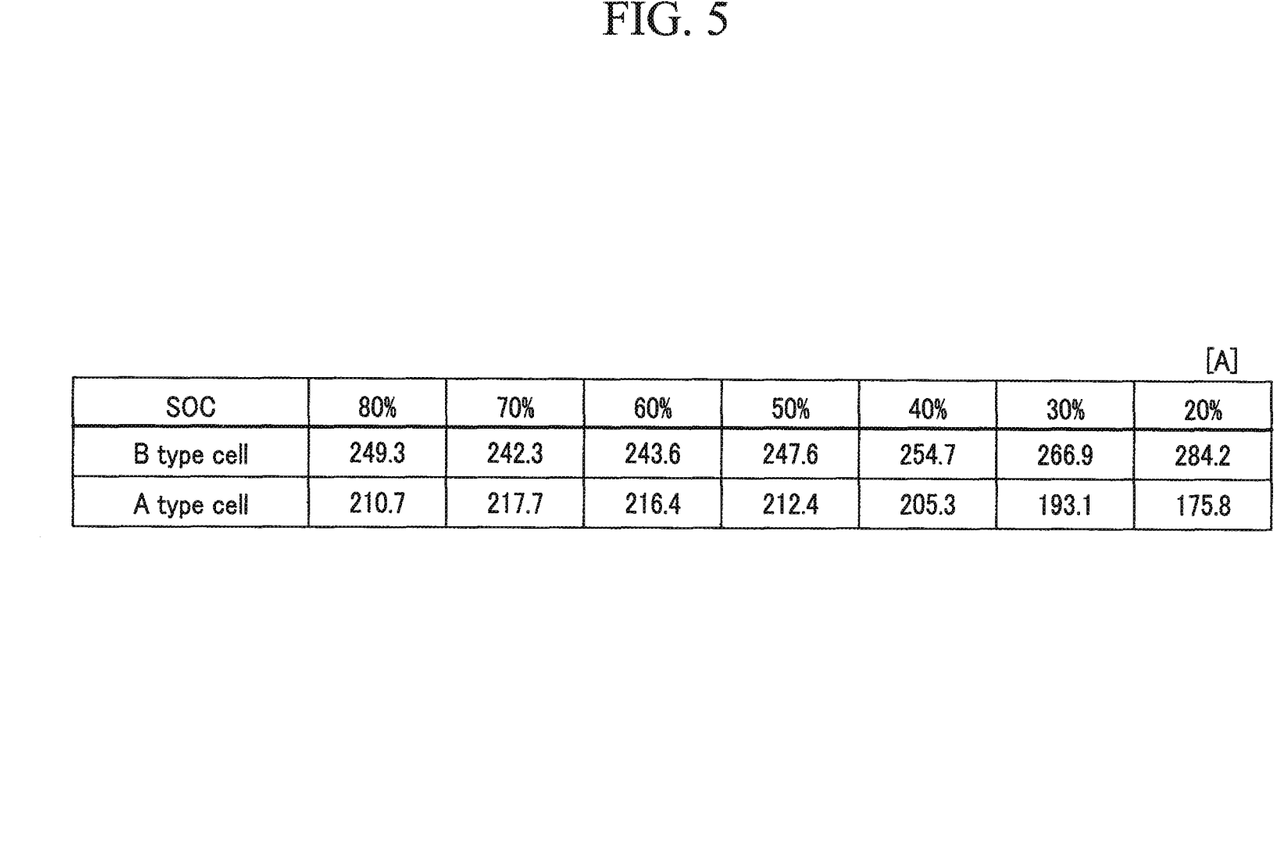
FIG. 5 is a table illustrating amounts of dispersions of currents that flow through an A type cell and a B type cell in a mixed cell.

FIG. 5 is a table illustrating amounts of dispersions of currents that flow through an A type cell and a B type cell in a mixed cell.

As illustrated in FIG. 4, the discharge power MP in accordance with the SOC of the battery pack 1 is lower than the discharge power AP in a region where the SOC is no less than 40% (e.g., is greater than or equal to 40%). However, the difference between these discharge powers is inconsequential considering cell cycle-life.

Furthermore, the discharge power AP and the discharge power BP are rapidly reduced in a region where the SOC is low, and as such, stability of power supplied to a load may be deteriorated.

Also, the discharge power MP is higher than the other discharge powers AP and BP when the SOCs are 30% and 20%, and a deviation between the discharge power MP when the SOC is 80% and the discharge power MP when the SOC is 20% is smaller than that between the discharge powers AP and BP when the SOC is 80% and the discharge powers AP and BP when the SOC is 20%. Accordingly, power stability is high in the battery pack 1 including the mixed cells.

As illustrated in FIG. 5, because a larger amount of current flows through a B type cell having a high cell cycle-life characteristic, a cycle-life of an A type cell having a high discharge power characteristic is increased so that a cycle-life of a mixed cell is increased.

Figure 6:
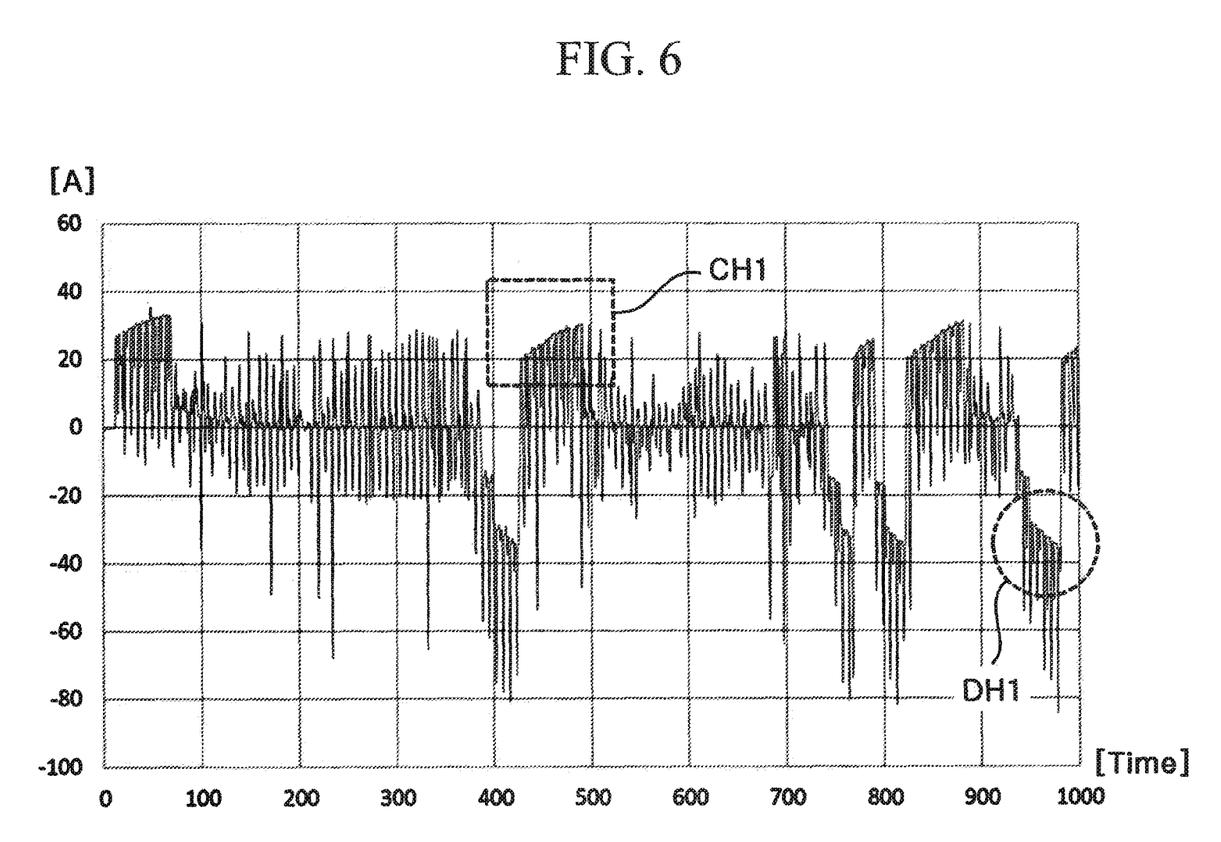
FIG. 6 is a waveform diagram illustrating current driving of an A type cell.
Figure 7:
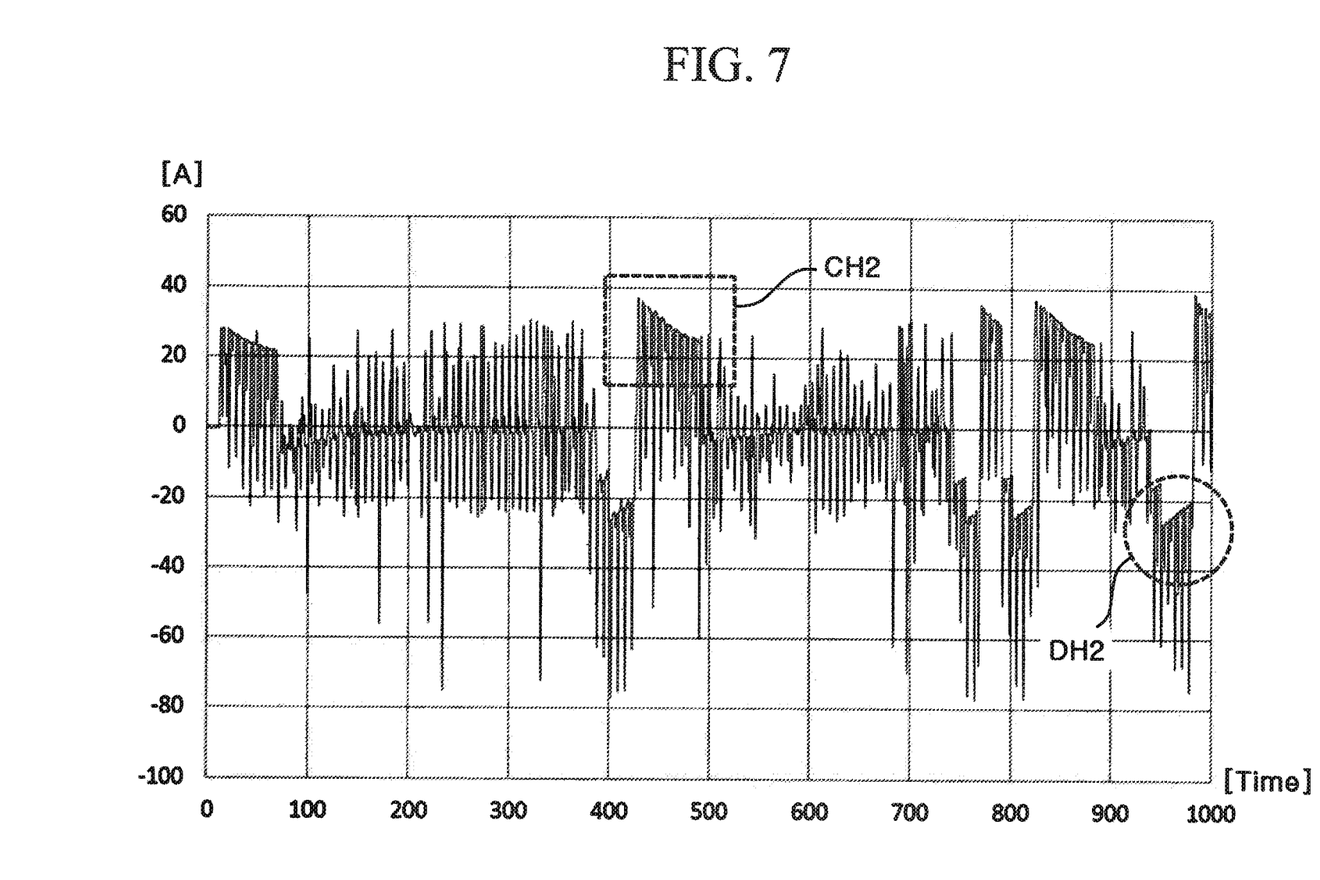
FIG. 7 is a waveform diagram illustrating current driving of a B type cell.

FIG. 6 is a waveform diagram illustrating current driving of an A type cell. FIG. 7 is a waveform diagram illustrating current driving of a B type cell.

In the waveform illustrated in FIG. 6, a peak of a current of an A type cell is increased in a charge section CH1.

In the waveform illustrated in FIG. 7, a peak of a current of a B type cell is increased to a high (e.g., a maximum) value and is then reduced in a charge section CH2. That is, a larger amount of peak current flows through the B type cell at a transient point in time when a change from discharge to charge is performed, and a current that flows through the A type cell having a large capacity is increased while a flow of a current (e.g., a charge direction) is maintained in one direction.

In the waveform illustrated in FIG. 6, a peak of a current of an A type cell is reduced in a discharge section DH1. That is, the absolute value of the current is increased.

In the waveform illustrated in FIG. 7, a peak of a current of a B type cell is increased in a discharge section DH2. That is, the absolute value of the current is decreased.

As shown in FIGS. 6 and 7, a larger amount of peak current flows through the B type cell at a transient point in time when a change from charge to discharge is performed, and a current that flows through the A type cell having a large capacity is increased while a flow of a current (e.g., a discharge direction) is maintained in one direction.

As described above, because the A and B type cells are coupled in parallel in the mixed cell, the maximum peak current flows through the B type cell. Also, because the maximum peak current flows through the B type cell having a high cell cycle-life characteristic, a cycle-life characteristic of the mixed cell is improved.

According to one embodiment, an amount of current that flows through the A type cell is increased while a flow of a current after the transient point in time is maintained in one direction so that output power may be improved.

While it has been described that the battery pack includes the mixed cells, the present invention is not limited thereto. For example, a sub-battery pack formed of one kind of cells and a sub-battery pack formed of different kinds of cells may be coupled in parallel to form one battery pack. Thus, the formed battery pack may also provide the above-described effect of improving the cell cycle-life and output power.

Figure 8:
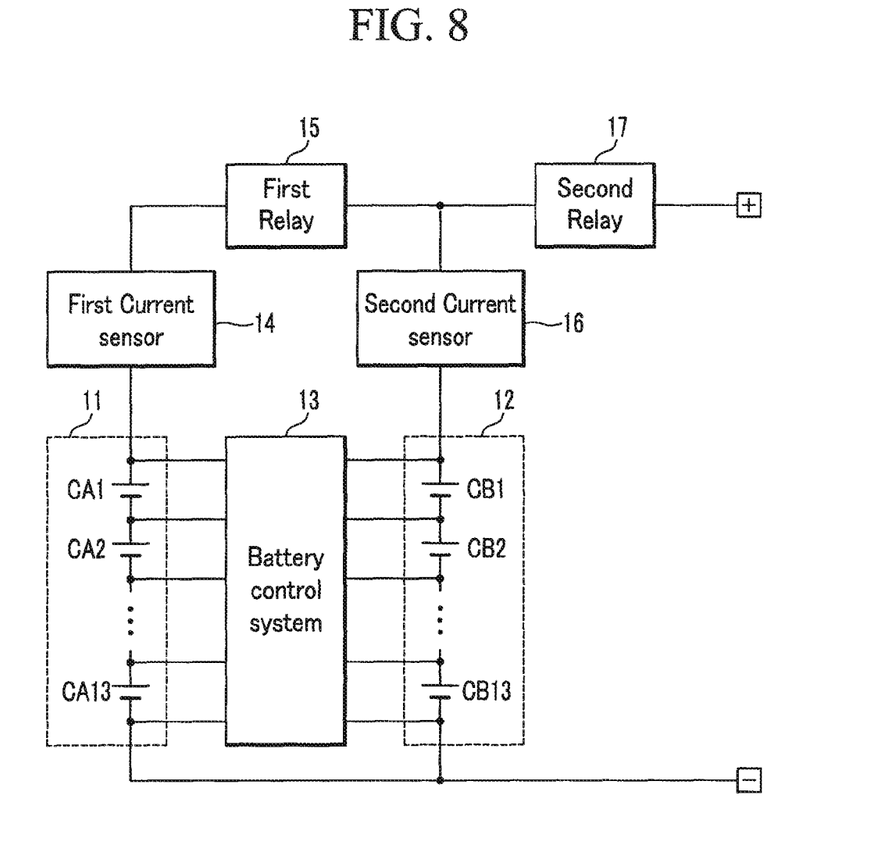
FIG. 8 is a schematic of a battery system according to another exemplary embodiment of the present invention.

FIG. 8 is a view illustrating a battery system according to another exemplary embodiment of the present invention.

In FIG. 8, a battery pack includes a sub-battery pack 11 and a sub-battery pack 12.

A first current sensor 14 for sensing a current of the sub-battery pack 11 and a second current sensor 16 for sensing a current of the sub-battery pack 12 may be included in a battery system.

A first relay 15 blocks or couples the sub-battery pack 11 and the sub-battery pack 12 from each other or to each other. A second relay 17 blocks or couples the battery pack, which includes the sub-battery pack 11 and the sub-battery pack 12, and a positive output end (+) from each other or to each other.

The first relay 15 may block a flow of a current between the sub-battery pack 11 and the sub-battery pack 12. Therefore, it is possible to block an unnecessary flow of a current between the sub-battery packs 11 and 12, which, for example, may be generated when a vehicle including the battery pack according to the exemplary embodiment of the present invention is parked.

Figure 9:
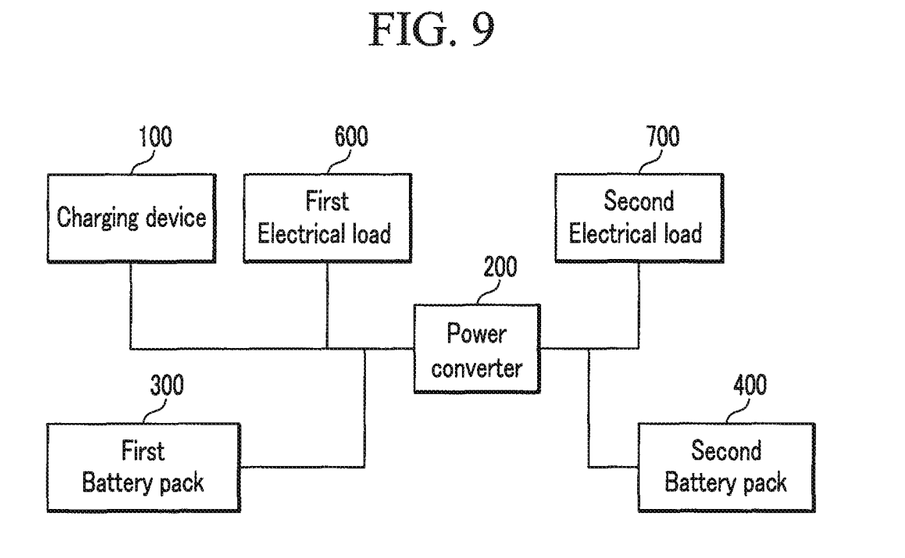
FIG. 9 is a block diagram illustrating a power device including a battery pack according to exemplary embodiments of the present invention.

FIG. 9 is a block diagram illustrating a power device including a battery pack according to exemplary embodiments of the present invention.

In FIG. 9, a charge device (or charging device) 100 receives energy from the outside to generate power. When a power device is a hybrid vehicle, power supplied from the outside may be generated by energy supplied from an engine.

A power converter 200 converts power supplied from the charge device 100 to transmit the converted power to a first battery pack 300 and a second battery pack 400. The first battery pack 300 and the second battery pack 400 may be charged by the transmitted power.

In addition, the power converter 200 converts power supplied from the first battery pack 300 and the second battery pack 400 to supply the converted power to at least one of a first electrical load 600 and a second electrical load 700. The power converter 200 may transmit power from the battery pack having a higher output power to the battery pack having a lower output power as between the first battery pack 300 and the second battery pack 400.

In one embodiment, at least one of the first battery pack 300 and the second battery pack 400 may be formed of the above-described battery pack including different kinds of cells.

Figure 10:
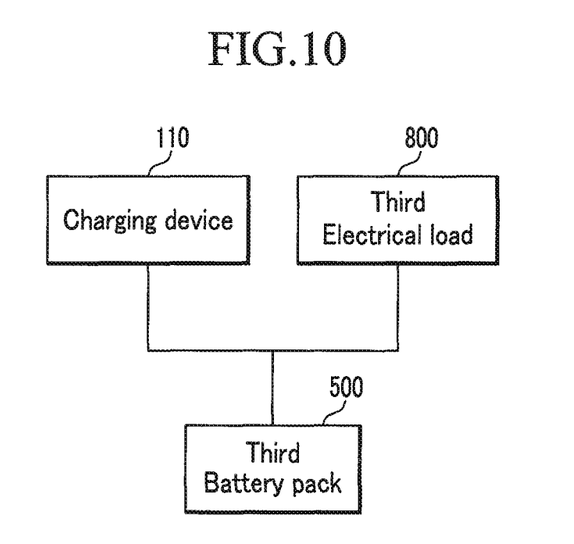
FIG. 10 is a block diagram illustrating another power device including a battery pack according to exemplary embodiments of the present invention.

FIG. 10 is a block diagram illustrating another kind of power device including a battery pack according to exemplary embodiments of the present invention.

In the power device of FIG. 10, a power converter is omitted (i.e., in comparison with the power device of FIG. 9) and a charge device 110 converts energy supplied from the outside into power to charge a third battery pack 500. A third electrical load 800 receives power from the third battery pack 500.

The third battery pack 500 may be formed of the above-described battery pack including different kinds of cells.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of Selected Symbols | |
|---|---|
| battery pack 1; | first relay 15; |
| battery management system 2 | second relay 17; |
| current sensor 3; | charge device 100 and 110; |
| relay 4; | power converter 200; |
| sub-battery pack 11 and 12; | first battery pack 300; |
| first current sensor 14; | second battery pack 400; |
| second current sensor 16 | third battery pack 500 |

What is claimed is:

1. A battery pack, comprising:
a plurality of serially coupled mixed cells comprising different kinds of cells, each mixed cell comprising a first cell as one kind of the different kinds of cells, and a second cell as another kind of the different kinds of cells, the second cell having a different electrical characteristic from that of the first cell and being coupled to the first cell in parallel,
wherein the electrical characteristic comprises at least one of an open circuit voltage characteristic corresponding to a state of charge, an internal resistance, an operation voltage, or a capacity,
wherein the first cell has a higher internal resistance than the second cell, and
wherein discharge power of the first cell is larger than discharge power of the second cell in a region where a state of charge (SOC) is low.

2. The battery pack of claim 1, wherein the internal resistance comprises the internal resistance when charging and the internal resistance when discharging.

3. The battery pack of claim 2, wherein a difference between the internal resistance of the first cell and the internal resistance of the second cell is from about 0.5 mΩ to about 1 mΩ.

4. The battery pack of claim 1, wherein a difference between the operation voltage of the first cell and the operation voltage of the second cell is from about 0.3V to about 1.5V.

5. A battery pack comprising sub-battery packs respectively comprising different kinds of cells, the sub-battery packs comprising:
a first sub-battery pack comprising a plurality of first cells as one kind of the different kinds of cells; and a second sub-battery pack comprising a plurality of second cells as another kind of the different kinds of cells, the second sub-battery pack being selectively coupled to the first sub-battery pack in parallel using a relay between the first sub-battery pack and the second sub-battery pack, wherein an electrical characteristic of the first cells is different from that of the second cells, wherein the electrical characteristic comprises at least one of an open circuit voltage characteristic corresponding to a state of charge, an internal resistance, an operation voltage, or a capacity, wherein the first cells have a higher internal resistance than the second cells, and wherein discharge power of the first cells is larger than discharge power of the second cells in a region where a state of charge (SOC) is low.

6. The battery pack of claim 5, wherein the internal resistance comprises the internal resistance when charging and the internal resistance when discharging.

7. The battery pack of claim 6, wherein a difference between the internal resistance of the first cells and the internal resistance of the second cells is from about 0.5 mΩ to about 1 mΩ.

8. The battery pack of claim 5, wherein a difference between the operation voltage of the first cells and the operation voltage of the second cells is from about 0.3V to about 1.5V.

9. A power device, comprising:
a first battery pack;
a second battery pack;
a power converter coupled between the first battery pack and the second battery pack; and
a charge device for converting energy supplied from outside the power device to supply a power to the power converter,
wherein the power converter is configured to supply the power supplied from the charge device to at least one of the first battery pack or the second battery pack,
wherein at least one of the first battery pack or the second battery pack comprises a plurality of serially coupled mixed cells, each mixed cell comprising different kinds of cells comprising first cells as one kind of the different kinds of cells and second cells as another kind of the different kinds of cells, the second cells having a different electrical characteristic from that of the first cells and being coupled to the first cells in parallel,
wherein the electrical characteristic comprises at least one of an open circuit voltage characteristic corresponding to a state of charge, an internal resistance, an operation voltage, or a capacity,
wherein the first cells have a higher internal resistance than the second cells, and
wherein discharge power of the first cells is larger than discharge power of the second cells in a region where a state of charge (SOC) is low.

10. A power device, comprising:
a first battery pack;
a second battery pack;
a power converter coupled between the first battery pack and the second battery pack; and
a charge device for converting energy supplied from outside the power device to supply a power to the power converter,
wherein the power converter supplies the power supplied from the charge device to at least one of the first battery pack or the second battery pack,
wherein at least one of the first battery pack or the second battery pack comprises sub-battery packs respectively comprising different kinds of cells, the sub-battery packs comprising:
a first sub-battery pack comprising a plurality of first cells as one kind of the different kinds of cells; and
a second sub-battery pack comprising a plurality of second cells as another kind of the different kinds of cells, the second sub-battery pack being selectively coupled to the first sub-battery pack in parallel using a relay between the first sub-battery pack and the second sub-battery pack, wherein an electrical characteristic of the first cells is different from that of the second cells, wherein the electrical characteristic comprises at least one of an open circuit voltage characteristic corresponding to a state of charge, an internal resistance, an operation voltage, or a capacity, wherein the first cells have a higher internal resistance than the second cells, and wherein discharge power of the first cells is larger than discharge power of the second cells in a region where a state of charge (SOC) is low.

11. A power device, comprising:
a charge device for converting energy supplied from outside the power device to supply a power to a power converter; and
a battery pack configured to be charged by the power supplied by the charge device,
wherein the battery pack comprises a plurality of serially coupled mixed cells, each of the mixed cells comprising different kinds of cells comprising first cells as one kind of the different kinds of cells and second cells as another kind of the different kinds of cells, the second cells having a different electrical characteristic from that of the first cells and being coupled to the first cells in parallel,
wherein the electrical characteristic comprises at least one of an open circuit voltage characteristic corresponding to a state of charge, an internal resistance, an operation voltage, or a capacity,
wherein the first cells have a higher internal resistance than the second cells, and
wherein discharge power of the first cells is larger than discharge power of the second cells in a region where a state of charge (SOC) is low.

12. A power device, comprising:
a charge device for converting energy supplied from outside the power device to supply power to a power converter; and
a battery pack configured to be charged by the power supplied by the charge device,
wherein the battery pack comprises sub-battery packs respectively comprising different kinds of cells, the sub-battery packs comprising:
a first sub-battery pack comprising a plurality of first cells as one kind of the different kinds of cells; and
a second sub-battery pack comprising a plurality of second cells as another kind of the different kinds of cells, the second sub-battery pack being selectively coupled to the first sub-battery pack in parallel using a relay between the first sub-battery pack and the second sub-battery pack, wherein an electrical characteristic of the first cells is different from that of the second cells, wherein the electrical characteristic comprises at least one of an open circuit voltage characteristic corresponding to a state of charge, an internal resistance, an operation voltage, or a capacity, wherein the first cells have a higher internal resistance than the second cells, and wherein discharge power of the first cells is larger than discharge power of the second cells in a region where a state of charge (SOC) is low.

* * * * *